United States Patent Office 3,629,177
Patented Dec. 21, 1971

3,629,177
PROCESS FOR PREPARING AN AQUEOUS SOLUTION OF A POLYVINYL ALCOHOL-FORMALDEHYDE-UREA POLYMER FOR USE IN WOOD FINISHING COMPOSITIONS
Gilbert F. Hoffmann, Mukwonago, Wis., assignor to O'Neil Duro Company, Milwaukee, Wis.
No Drawing. Continuation-in-part of application Ser. No. 792,856, Jan. 21, 1969, which is a continuation-in-part of application Ser. No. 759,508, Sept. 12, 1968. This application Feb. 28, 1969, Ser. No. 803,440
Int. Cl. C08g 13/00; C09d 3/52
U.S. Cl. 260—29.4 UA                                           14 Claims

ABSTRACT OF THE DISCLOSURE

A water soluble surface finishing composition that produces a clear, plastic finish having high abrasion resistance, comprising an aqueous solution containing a stablized water soluble urea-formaldehyde vinyl alcohol polymer, a water soluble surface tension reducing agent, and a silicone oil, the composition having a pH above 7; and a wood product coated with said finishing composition.

---

This application is a continuation-in-part of application Ser. No. 792,856, filed Jan. 21, 1969, now abandoned, which was filed as a continuation-in-part of application Ser. No. 759,508 filed Sept. 12, 1968, now abandoned, and hence the invention disclosed herein relates to a water soluble resin coating composition especially suitable for use on wood surfaces, and which, when applied thereto, produces a clear, even, abrasion resistant finish. The invention thus also relates to products having this coating composition applied thereto—as, for instance, wood paneling and furniture and siding for outdoor use which can be made in various colors and with various surface effects.

In the manufacture of hard plastic coated surfaces it is customary to use relatively expensive clear resins or lacquers that are dispersed in an organic solvent. The organic solvent is usually a potential fire hazard and the fumes resulting from its use are a health hazard to the workers in the surrounding work area.

A great deal of research has been undertaken by those who work in this industry to develop a water soluble resin composition that will produce a hard, clear uniform plastic finish on surfaces coated therewith. However, all of the previously available water soluble resin compositions, when tested, were found to have the major disadvantage of requiring a long bake at high temperatures which obviously rules them out for use on wood.

Heretofore, to the best of my knowledge, there has never been a water soluble coating composition for coating wood and other panels and furniture, which forms a uniform, hard, clear, water and abrasion resistant finish, and which does not require long high temperature curing or baking, but—on the contrary—cures in a matter of seconds so that it is suitable for use on high speed continuous coating assembly lines.

The coating composition of this invention, in general terms, comprises an aqueous solution having a pH of at least 7 and containing an effective amount of a film-forming water soluble stabilized urea-formaldehyde polyvinyl alcohol polymer, an effective amount of a water soluble, non-acid surface tension reducing agent, and an effective amount of a silicone oil water-proofing agent.

More specifically, the coating composition of this invention contains a water solution having at least 15%, and preferably approximately 25–50% and more by weight of a special type of stabilized water soluble urea-formaldehyde polyvinyl alcohol polymer, a non-acid water soluble surface tension reducing agent in an amount depending upon the nature of the substrate for which the coating composition is intended, an effective amount of a silicone oil as an anti-foaming agent that also improves the water resistance of the composition, and an effective amount of water soluble alkaline agent such as ammonium hydroxide, sodium hydroxide, etc. or a volatile amine such as ethyl amine, to adjust the pH of the mixture to pH of 7 and above say between 7 and 9—and preferably between 7 and 8. I have found that by keeping this mixture slightly alkaline, the polymer remains stable and clear despite the relatively high resin concentration of the composition for periods up to four months and more in closed opaque containers.

The term stabilized polymer means that the polymers are stabilized to remain clear, to remain in solution and to remain fluid.

The water soluble stabilized urea-formaldehyde polyvinyl alcohol polymers of this invention are new. A preferred method of making the resins of this invention is by stabilizing 150–225 parts by weight of a commercial 40% aqueous solution of formaldehyde (2 to 3 moles of formaldehyde) with 1–2 moles of a known stabilizing agent such as 34 to 50 parts by weight of methyl alcohol. Other known stabilizing agents, such as ethyl alcohol, propyl alcohol, ethylene glycol and the polyglycols, etc. may be used.

The stabilized formaldehyde is reacted by heating it, say at 140° F. and above, with 44 to 88 parts by weight, or 1 to 2 mole equivalents of vinyl alcohol in the form of an aqueous solution of a water soluble substantially hydrolyzed polyvinyl alcohol; preferably a commercially available polyvinyl alcohol that has a low viscosity at temperatures up to 190° F. and a molecular weight of about 25,000–35,000. This mixture is then reacted with 60 parts (1 mole of) urea by further heating, say at temperatures of 160 to 180° F. or higher, to form the water soluble polymer.

It will be understood that any constant multiple of the proportion set out above can be used.

The formation of urea-formaldehyde polyvinyl alcohol resin, and the polymerization of the final coating are preferably catalyzed with an acid salt catalyst which has a pH of approximately 6, such as up to 2% by weight $NH_4NO_3$. Although many other catalyst salts with a pH of approximately 6 may be used, I have found that the volatile $NH_4NO_3$ catalyst produces a good, fast cure, does not decrease the water resistance of the polymer coating composition, acts as a buffer to keep the reaction slightly acid and provides a better than three hour pot life. The use of acids as catalysts is not desirable because it is difficult to control the reaction when such catalysts are used.

The preferred viscosity of the urea-formaldehyde-polyvinyl alcohol polymers of this invention for spray coating application is 20 to 30 seconds, and for roller coating applications is 60 to 100 seconds on the number four Ford Cup Scale.

The mole proportions of 2 to 3 moles formaldehyde, 1–2 moles of polyvinyl alcohol to one mole of urea, the pH and the order of mixing the reactants set forth above are important in obtaining the polymers and coating compositions having the high stability, high clarity and high solid one step coating properties required to coat wood, particle board, wall board, etc. with a coating that has many of the properties of high pressure laminated plastic sheets of melamine and phenolic resin impregnated materials such as "Formica."

If less than one mole of vinyl alcohol in the form of polyvinyl alcohol were used per mole of urea the polymer begins to lose film strength, its properties will approach those of urea formaldehyde and the coating composition will lose its good coating characteristics. If more than 2 moles of polyvinyl alcohol (in vinyl alcohols equivalents) are present the polymers viscosity becomes too high for proper coating and the coating composition must be diluted. Such coating compositions require numerous coating application to equal the one step coating thickness of the compositions of this invention.

If more than 3 moles of formaldehyde are used per mole of urea the resin and the coating composition containing the resin have a strong formaldehyde odor and when the resin is cured excess formaldehyde is released which would pollute the atmosphere of the surrounding work area. This excess formaldehyde also may form insoluble formaldehyde polymers in the coating composition during storage.

When more than 1 mole of urea is used with the above proportions of formaldehyde and polyvinyl alcohol the coating composition becomes unstable and the water resistance of the coating is decreased. If less than one mole of urea were used we would then have an excess of formaldehyde.

The stabilizer, such as methyl alcohol, and the use of an excess of formaldehyde helps reduce turbidity in the solutions produced, thereby assuring clearer coating compositions and easier application thereof to wood surfaces.

In a preferred embodiment of the invention distilled or deionized water that is particularly free of Ca, Mg and Fe ions is used to produce a solution which contains preferably 30 to 40% by weight of the resin. If more than 40% of the resin is in solution, the composition is likely to become turbid and unstable on aging. However, if the composition were to be used soon after it was prepared, higher resin concentrations could be used. Deionized or distilled water is preferred since it provides better clarity and stability on aging of the coating compositions, but ordinary tap water could be used where high clarity is not an important factor.

The non-acid surface tension reducing agent which lowers the surface tension of the mixture is an important ingredient because, without it, the coating will not uniformly cover some surfaces to which it is applied but will "crawl" and leave areas uncoated. As indicated hereinbefore, the amount of the surface tension reducing agent needed depends upon the nature of the surface for which the coating composition is intended. For glass-smooth or other non-absorbent and difficulty wet surfaces, it should be sufficient to lower the surface tension of the composition to 20 to 40 dynes and preferably to 20 to 30 dynes/cm. at 25° C. For use on less dense surfaces such as wood, paper and leather—all of which have been successfully coated with the composition of this invention—the surface tension reduction need not be as great and can even approach that of water which is approximately 72 dynes/cm. at 25° C. Preferred non-acid surface tension lowering compounds are the sodium salts of dioctyl sulfo-succinate, dihexyl sulfo-succinate and diamyl sulfo-succinate, but other non-acid surface tension reducing compounds may be used, and preferably those which will lower the surface tension of the mixture to 20–30 dynes.

An excessive amount of the surface tension lowering agent should be avoided since it may tend to stabilize any bubbles that may form in the solution and coating composition. When using dioctyl sodium sulfo-succinate, it is best to use 10 parts of a 10% by weight aqueous solution based on the 150–225 parts formaldehyde as set forth above.

The use of an acid surface tension reducing agent is undesirable because it acts as a urea-formaldehyde-polyvinyl alcohol polymerization catalyst and makes the solution unstable.

The silicone oil can be any known silicone oil that is sufficiently soluble in the resin solution, and it is used in relatively small amounts. The maximum amount of silicone oil used is determined by its solubility in the aqueous solution. It should be used in amounts which are large enough to render the composition water resistant and small enough to obtain uniform distribution throughout the mixture, 0.01 to 2% by weight is an illustrative amount to be added to the composition.

In addition to increasing the water resistance of the mixture, the silicone oil is an anti-foaming agent which acts as a bubble breaker, aids in dispersing pigments and resins in the aqueous solution, improves mar resistance and improves the gloss of the coatings obtained. As long as it is in solution, uniform dispersion is assured.

Preferred silicone oils are linear dimethylpoly-siloxanes having the formula:

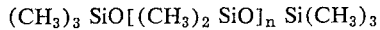

$$(CH_3)_3 SiO[(CH_3)_2 SiO]_n Si(CH_3)_3$$

in which $n$ has a value that would give the silicone oil a viscosity of 4 to 40 centistokes at 25° C. and has a surface tension of 20–30 dynes. These preferred silicone oils are water white, clear and mobile liquids.

Color, if desired, can be incorporated in the composition by using any of the known non-acid water soluble dyes and pigments.

The compositions of this invention may be diluted with water in an amount depending not only upon the purpose for which the composition is to be used—for instance, a wash coat, a seal coat or a top coat on wood surfaces—but also upon the manner in which the coating is to be applied. For example, if the coating is applied in the form of a spray, more water would be added to facilitate spraying than if the coating is to be applied with a brush or a roller coater.

The coating compositions of this invention are further illustrated by the following examples:

EXAMPLE I

To 200 pounds of deionized water (which could be distilled water) the following was added:

200 pounds of a 40% solution of formaldehyde
33 pounds of methyl-alcohol
6 pounds of ammonium hydroxide, which is 28% $NH_3$
6 pounds of a 10% deionized water solution of dioctyl sodium sulfo-succinate
7 cc. of General Electric SF69 Silicone Fluid (SF69 is a clear, water white, mobile liquid which contains 100% dimethyl silicone polymers, has a viscosity of 4 to 40 centistokes at 25° C., a specific gravity of 0.96–0.97 at 20° C., and a surface tension of approximately 20 dynes/cm. at 25° C.)

To the foregoing aqueous solution 90 pounds of a low viscosity substantially completely hydrolyzed polyvinyl alcohol which has a molecular weight of 25,000 to 35,000 was added. The resulting mixture was heated to 160° F., while being agitated until there was no apparent further reduction in viscosity of the solution. The consequent reaction produced a solution which, because of the presence of the ammonium hydroxide, had a pH of 7–9.

60 pounds of urea was then added to the 160° solution with agitation and heating being continued for 30 minutes with the temperature of the mixture being maintained between 160° F. and 180° F.

The resulting composition was then allowed to cool to room temperature, all the while continuing the agitation.

After cooling, 3 more pounds of ammonium hydroxide was added to definitely put the composition on the alkaline side.

The composition of this example had a shelf life of in excess of three months, during which period it remained clear and gels did not form. For increased stability on aging (shelf life) a bit more $NH_3$ or either sodium hydroxide or potassium hydroxide, on the order of one pound or less, can be added.

Prior to use of the foregoing composition, a catalyst is added. Specifically this is done by mixing with 16 to 32 parts of the composition 1 part by volume of a 20% solution of the catalyst ammonium nitrate dissolved in water. This catalyst makes the composition slightly acid and keeps it slightly acid so the coating cures on the surface to which it is applied. Where faster cures are desired, the proportion of the catalyst used can be doubled.

This coating composition of the aforementioned example, after addition of the catalyst, was found to have a pot life in excess of three hours, had excellent stability on aging during this period, and the mixture remained relatively clear and no gels formed.

EXAMPLE II

To the 588 pounds or 60 gallons of the composition of Example I, 70 pounds of triethylene glycol was added as a plasticizing agent.

Since the triethylene glycol plasticizing agent is perfectly miscible with the composition, it need not be added to the composition before the addition of the catalyst, as in Example II, but can be added at any time. Also, as will be readily understood, the specific amount of the plasticizing agent employed is not significantly critical and can be increased or decreased from the proportion stated in Example II in accordance with the degree of plasticity desired and the nature of the substrate to be coated. Thus the amount of the plasticizing agent may be between 5% and 25% of the total composition.

Although ethylene glycol or di-ethylene glycol could be used for the plasticizing agent, triethylene glycol is preferred because of its much higher boiling point, making it less volatile.

The manner of applying the catalyzed composition to a substrate will, of course, depend upon the nature of the substrate. For coating wood panels and the like, a substantially conventional panel finishing line may be used to carry the panels through a roller coater or a curtain coater by which the composition with the catalyst added thereto is laid on the surface to be coated. The thus coated panels pass through a conventional heated flash-off zone to evaporate the water, and then go directly through a heating zone where the coated surface is subjected to heat at 140° F. (produced by infrared heat lamps or otherwise) for 8 to 10 seconds. During this very short exposure to heat at the stated temperature, the resin is fully polymerized.

Even without further attention the composition applied as described produced a clear, hard, water insoluble and abrasion resistant coating on birch, walnut, cherry and other wood panels. The abrasion resistance of the coating was found to be eight to ten times better than that of coatings of lacquers, such as nitro-cellulose and/or urea-formaldehyde alkyds etc., that are normally used in finishing wood furniture, wood panels, and like surfaces.

A cost significant advantage of the composition of this invention is that by simply increasing or decreasing its water content, the same composition can be used for different purposes. In its "thinned" condition it is an excellent wash coat; with some what higher viscosity and with the addition of transparent dye, it becomes a stain or wood toner. Used at full viscosity with pigmented color, it is a high speed filler, and without coloring it can be applied in multiple coats to build a finish as "high" as desired, and one which can be rubbed to a "piano" finish or polished to a high gloss.

Because of the unusual toughness of coatings produced by the composition of either of the aforesaid examples, coatings thereof will accept and stand up even under most severe burnishing. In one production test, a one-half (½) mil close-to-the-wood coat of the composition of Example I on a wall panel was given a "furniture-top rubbed finish" in a high speed wide belt sander with a 400-grit belt.

To determine how well the coating of Example I would stand up for outdoor use, redwood panels with one seal coat and one top coat of that composition were roof-tested. After four months of exposure to the elements, examination of the coating disclosed no failure.

The coating compositions of the aforesaid examples have been successfully applied to many different substrates, including hardboard floor and wall tiles, and paper. Paper coated with this composition is especially good for packaging where retention of liquid or protection from moisture is necessary. In the preparation of test samples, both kraft paper and ordinary white writing paper were coated with the composition of Example II by simply brushing the same onto the paper surface and allowing it to dry.

The composition of Example II which contains the plasticizing agent, was found to produce a "patent-leather" like finish on soft black leather, specifically doe skin. Here again, the composition was simply brushed onto the substrate, i.e. the smooth, finished side of the leather. The thus coated leather could be folded and creased without any evidence of cracking the coated surface.

It is well known in this art that urea-formaldehyde resins are brittle and have little abrasion resistance—when they are sanded these resins turn to a powder. Therefore, the prior art resins based on urea-formaldehyde made poor finishing materials for wood, and were even less suitable for use on paper and leather.

The high clarity, coating uniformity and shelf life of the coating compositions of this invention were unexpected, as was also the abrasion resistance and clarity of the finished coating formed by these compositions. The fact that the resins did not become turbid and that water soluble urea-formaldehyde polyvinyl alcohol gels did not form was also unexpected.

EXAMPLE III

To form a resin composition for coating paper or for use in inks, paints, etc., I mixed the 11 moles of deionized water, 2 moles of formaldehyde in the form of a 40% aqueous solution with 1 mole of methyl alcohol and one mole of vinyl alcohol equivalent in the form of a low viscosity substantially completely hydrolyzed polyvinyl alcohol having a molecular weight of 25,000 to 35,000. The pH was adjusted to 8 with $NH_4OH$. The resulting mixture was heated to 170° F., while being agitated, until the viscosity of the solution was such that the hot solution readily dripped from a glass thermometer.

One mole of urea was then added to the 170° F. solution with agitation and the heating was continued for 30 minutes at 170° F.

The resulting product was cooled to room temperature while under agitation. This composition was mixed with 2% by weight of $NH_4NO_3$ in the form of a 10% aqueous solution.

The resulting catalyzed coating composition was applied with a brush to a white sheet of writing paper and the coating formed was glossy, very hard, scratch resistant, clear plastic coating that had a thickness of about ½ mil.

By comparative tests I have found that if the resin content of the composition is 15% or less, much of the coating is absorbed by wood or the like, and is wasted, so that a number of coating applications to build up a reasonably satisfactory protective plastic finish are required. On the other hand, when the coating composition contains 25% or more resin, the resin is not absorbed by wood and similar substrates, and a single coating forms a hard, clear, lacquered finish.

A small percentage of the urea can be replaced with melamine, say up to 10%, without substantial impairment of the quality of my resin composition but this would result in an economic disadvantage.

I prefer to use a completely, or substantially completely, hydrolyzed grade of polyvinyl alcohol such as a polyvinyl acetate alcoholized to 99–100% due to the fact that the unhydrolyzed acetate groups can hydrolyze in the aqueous solution to form acetic acid which could catalyze the resin composition unless one was careful to maintain the pH of the resin solution at a pH of 7 or above.

I find that by cooking an admixture of the polyvinyl alcohol and the commercial grade of formaldehyde in the aqueous media under the disclosed alkaline conditions before adding the urea I obtain upon further heating a less viscous and more stable high solid coating mixture than obtained when all three ingredients are present initially or when the formaldehyde and urea are both added after an initial heating of the polyvinyl alcohol. The high solids coating composition as first discussed in this paragraph is stable and remains clear when stored in opaque containers over many months and may be applied per se. Upon the addition of an acid-reacting catalyst to convert the coating composition to a mildly acid pH, a coating can be applied to a porous material such as paper to form a highly water and spot resistant clear coating.

In contrast a resin solution formed by mixing the same amounts of polyvinyl alcohol, formaldehyde, and urea at one time became milky after 3 to 4 days storage and gelled in 1–3 weeks even when stored in opaque containers. Once the resin gelled it became useless. Coatings obtained upon application of such resin compositions have poor water resistance when compared to coatings formed from resin compositions prepared in conformity with my preferred procedure for preparing my resins.

The presence of the silicone oil makes the polymer coating more water repellent and less subject to bubble formation. The presence of the surface tension reducing agent is important in coating surfaces which are difficult to wet or relatively impervious.

Those skilled in the wood finishing art will appreciate the many advantages of the coating compositions of this invention, but lest they be overlooked, the following are some of the rather significantly beneficial consequences of these coating compositions.

The coating composition can be stored anywhere in the plant—there is no need for protective fire walls and separate storage or mixing facilities; it is not explosive; "solvent" for mixing and cleanup comes right out of any convenient water tap; use of the coating compositions produces no noxious fumes, hence it creates no pollution problems; and being water soluble the composition can be readily diluted for use as wash coats, fillers, seal coats, and various top coats with different characteristics—one basic formulation may be mixed or modified out of one central container as needs require.

What is claimed as my invention is:

1. A method of preparing a polyvinyl alcohol-formaldehyde-urea polymer especially well adapted for treating wood and other cellulosic substances and soluble in water in a concentration of at least 15%, comprising
   (1) mixing an aqueous solution of a water soluble polyvinyl alcohol and formaldehyde in respective molar equivalents of about 1 to 2:2 to 3 and heating and reacting said mixture at a pH above 7 at a temperature between about 140 and 190° F. for a period of time until the viscosity of the solution is reduced; and, then
   (2) adding about one mole equivalent of urea to said aqueous solution and continuing the heating at said temperature range until said polymer is formed.

2. A method of preparing a polyvinyl alcohol-formaldehyde-urea polymer especially well adapted for treating wood and other cellulosic substances and soluble in water in a concentration of at least 15%, comprising mixing an aqueous solution of a water soluble polyvinyl alcohol, formaldehyde, and urea in respective molar equivalents of about 1 to 2:2 to 3:1 and heating and reacting the mixture at a pH above 7 and at a temperature between about 140 and 190° F. for a period of time until the viscosity of the solution is reduced and said polymer is formed.

3. The process of claim 2 containing a surface tension reducing amount of a non-acid surface tension reducing agent.

4. The process of claim 2 containing a silicone oil in an amount sufficient to increase the water resistance of a coating obtained therefrom.

5. The process of claim 2, wherein the water of said aqueous solution is deionized.

6. The process of claim 2, wherein the surface tension of said aqueous solution is 20–70 dynes/cc. at 25° C.

7. The process of claim 2, wherein the surface tension of said aqueous solution is 20–40 dynes/cm. at 25° C.

8. The process of claim 5, wherein the surface tension of the aqueous solution is 20–30 dynes/cm. at 25° C.

9. The process of claim 6, wherein said tension reducing agent is a sodium dialkyl sulfosuccinate.

10. The process of claim 2, wherein said silicone oil is a clear, water white linear dimethyl polysiloxane.

11. The process of claim 2, wherein said pH is 7 to 8.

12. The process of claim 11, wherein said aqueous solution has been catalyzed with ammonium nitrate.

13. The process of claim 2, which has added thereto a coating catalyst which reduces the pH of said composition to less than 7.

14. The process of claim 11, wherein said coating catalyst is ammonium nitrate.

References Cited

UNITED STATES PATENTS

| | | | |
|---|---|---|---|
| 2,282,026 | 5/1942 | Bren et al. | 260—73 L |
| 2,612,482 | 9/1952 | Rasmussen | 260—29.4 |
| 2,757,152 | 7/1956 | Solomon | 260—29.4 X |
| 2,758,946 | 8/1956 | Spalding et al. | 260—29.4 X |
| 2,839,429 | 6/1958 | Marsh et al. | 260—29.4 X |
| 3,062,764 | 11/1962 | Osdal | 260—29.4 U X |
| 3,153,009 | 10/1964 | Rombach | 260—73 L |

JULIUS FROME, Primary Examiner

J. B. LOWE, Assistant Examiner

U.S. Cl. X.R.

260—294 R, 73 L